United States Patent
Duesler et al.

(10) Patent No.: US 11,572,928 B2
(45) Date of Patent: Feb. 7, 2023

(54) HEAT EXCHANGER FOR COOLED COOLING AIR WITH ADJUSTABLE DAMPER

(71) Applicant: United Technologies Corporation, Farmington, CT (US)

(72) Inventors: Paul W. Duesler, Manchester, CT (US); Frederick M. Schwarz, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1006 days.

(21) Appl. No.: 16/279,358

(22) Filed: Feb. 19, 2019

(65) Prior Publication Data

US 2019/0178164 A1 Jun. 13, 2019

Related U.S. Application Data

(60) Division of application No. 15/062,400, filed on Mar. 7, 2016, now Pat. No. 10,253,695, which is a
(Continued)

(51) Int. Cl.
*F02C 7/18* (2006.01)
*F16F 7/09* (2006.01)
(Continued)

(52) U.S. Cl.
CPC ............. *F16F 7/09* (2013.01); *F02C 7/141* (2013.01); *F02C 7/18* (2013.01); *F02C 7/185* (2013.01);
(Continued)

(58) Field of Classification Search
CPC ...... F16F 9/44; F16F 9/443; F16F 7/08; F16F 7/02; F16F 9/08; F16F 9/3207;
(Continued)

(56) References Cited

U.S. PATENT DOCUMENTS 2,243,782 A  5/1941  Thornhill
3,117,624 A  1/1964  Johan
(Continued)

FOREIGN PATENT DOCUMENTS

EP   1010878   6/2000
EP   2339159   6/2011
(Continued)

OTHER PUBLICATIONS

European Patent Office, European Office Action dated Feb. 23, 2021 in Application No. 19181390.6.
(Continued)

*Primary Examiner* — Vishal R Sahni
(74) *Attorney, Agent, or Firm* — Snell & Wilmer L.L.P.

(57) ABSTRACT

A heat exchanger (HEX) for cooling air in a gas turbine engine is provided. An adjustable damper is provided. The adjustable damper may be for damping a movement of the HEX relative to the gas turbine engine. An adjustable damper may comprise: a first tube; a second tube located at least partially within the first tube; a housing coupled to the second tube; a moveable member, the moveable member comprising a contacting surface in contact with the second tube; an adjusting member adjustably coupled to the housing; and a spring member located between the moveable member and the adjusting member, the spring member configured to at least one of compress or decompress in response to adjusting member moving relative to the housing.

2 Claims, 14 Drawing Sheets

Related U.S. Application Data continuation-in-part of application No. 14/826,905, filed on Aug. 14, 2015, now Pat. No. 10,287,982.

(60) Provisional application No. 62/278,649, filed on Jan. 14, 2016.

(51) Int. Cl.

| | | |
|---|---|---|
| *F28F 9/02* | (2006.01) | |
| *F02K 3/115* | (2006.01) | |
| *F02C 7/141* | (2006.01) | |
| *F04D 29/58* | (2006.01) | |
| *F28F 9/24* | (2006.01) | |
| *F28D 7/06* | (2006.01) | |
| *F16F 7/08* | (2006.01) | |
| *F28D 1/047* | (2006.01) | |
| *F28D 21/00* | (2006.01) | |

(52) U.S. Cl.
CPC .......... *F02K 3/115* (2013.01); *F04D 29/5826* (2013.01); *F16F 7/085* (2013.01); *F28D 7/06* (2013.01); *F28F 9/0268* (2013.01); *F28F 9/24* (2013.01); *F05D 2260/213* (2013.01); *F28D 1/0475* (2013.01); *F28D 2021/0021* (2013.01); *F28D 2021/0026* (2013.01); *Y02T 50/60* (2013.01)

(58) Field of Classification Search
CPC ........ B62D 21/15; B62D 25/00; B62D 25/20; B60G 2206/014; B60G 2206/60; B60R 2019/007; B60R 19/02
See application file for complete search history.

(56) References Cited

U.S. PATENT DOCUMENTS

| | | | | |
|---|---|---|---|---|
| 3,176,590 | A * | 4/1965 | Uhtenwoldt | B23B 31/1178 279/4.06 |
| 3,770,290 | A | 11/1973 | Bottalico | |
| 4,120,150 | A | 10/1978 | Wakeman | |
| 4,187,675 | A | 2/1980 | Wakeman | |
| 4,457,741 | A * | 7/1984 | Hoeptner, III | F16H 7/129 403/368 |
| 4,528,733 | A | 7/1985 | Lord | |
| 4,901,829 | A | 2/1990 | East, Jr. et al. | |
| 4,976,310 | A | 12/1990 | Jabs | |
| 4,979,665 | A | 12/1990 | Gruene et al. | |
| 5,729,969 | A | 3/1998 | Porte | |
| 5,782,077 | A | 7/1998 | Porte | |
| 6,412,606 | B1 * | 7/2002 | Wu | F16F 7/082 188/68 |
| 6,581,965 | B2 * | 6/2003 | Lutz | B62D 1/184 280/775 |
| 7,424,835 | B2 * | 9/2008 | Adoline | B62D 1/184 280/775 |
| 8,510,945 | B2 * | 8/2013 | Hand | F02K 3/115 60/730 |
| 8,567,572 | B2 * | 10/2013 | Lafitte | F16F 7/08 188/134 |
| 9,708,007 | B2 * | 7/2017 | Ohtani | B62D 25/20 |
| 2001/0015059 | A1 | 8/2001 | Fetescu et al. | |
| 2003/0184026 | A1 | 10/2003 | Wilcox et al. | |
| 2004/0057786 | A1 * | 3/2004 | Heiml | B62D 1/195 403/373 |
| 2007/0157859 | A1 | 7/2007 | Inomata | |
| 2008/0256986 | A1 | 10/2008 | Ackermann | |
| 2009/0025366 | A1 | 1/2009 | Martinou | |
| 2010/0116477 | A1 | 5/2010 | Mulder | |
| 2011/0088405 | A1 | 4/2011 | Turco | |
| 2012/0056035 | A1 * | 3/2012 | Luce | B64C 25/26 244/102 SL |
| 2015/0377135 | A1 | 12/2015 | Kupiszewski | |
| 2016/0059808 | A1 * | 3/2016 | Ohtani | B60R 19/02 293/104 |
| 2018/0163808 | A1 * | 6/2018 | Bauer | F16F 7/09 |

FOREIGN PATENT DOCUMENTS

| | | |
|---|---|---|
| EP | 2492472 | 8/2012 |
| GB | 2261941 | 6/1993 |
| JP | 2005140451 | 6/2005 |
| WO | 2011141770 | 11/2011 |
| WO | 2015041855 | 3/2015 |

OTHER PUBLICATIONS

European Patent Office, European Search Report dated Sep. 20, 2019 in Application No. 19181390.6.
European Patent Office, Partial European Search Report dated Sep. 19, 2020 in European Application No. 20156729.4.
European Patent Office, Partial European Search Report dated Jun. 10, 2020 in European Application No. 20156729.4.
Extended European Search Report dated Jun. 1, 2017 in European Application No. 17151511.7.
Paul W. Duesler, et al., U.S. Appl. No. 14/826,905, filed Aug. 14, 2015 and entitled "Folded Heat Exchanger for Cooled Cooling Air".
European Patent Office, Extended European Search Report dated Jan. 19, 2017 in European Application No. 16182828.0.
European Patent Office, Extended European Search Report dated Apr. 19, 2017 in European Application No. 16182828.0.
USPTO, Restriction/Election Requirement dated Sep. 7, 2018 in U.S. Appl. No. 14/826,905.
USPTO, Pre-Interview First Office Action dated Nov. 20, 2018 in U.S. Appl. No. 14/826,905.
USPTO, Pre-Interview First Office Action dated Nov. 20, 2018 in U.S. Appl. No. 15/062,400.
USPTO, Notice of Allowance and Fees Due (PTOL-85) dated Jan. 15, 2019 in U.S. Appl. No. 15/062,400.
USPTO, Requirement for Restriction/ Election dated Sep. 21, 2018 in U.S. Appl. No. 15/062,400.
Paul W. Duesler, et al., U.S. Appl. No. 15/062,400, filed Mar. 7, 2016 and entitled "Heat Exchanger for Cooled Cooling Air With Adjustable Damper".
USPTO, Notice of Allowance and Fees Due (PTOL-85) dated Feb. 4, 2019 in U.S. Appl. No. 15/826,905.
USPTO, Non-Final Office Action dated Apr. 14, 2022 in U.S. Appl. No. 16/364,524.

* cited by examiner

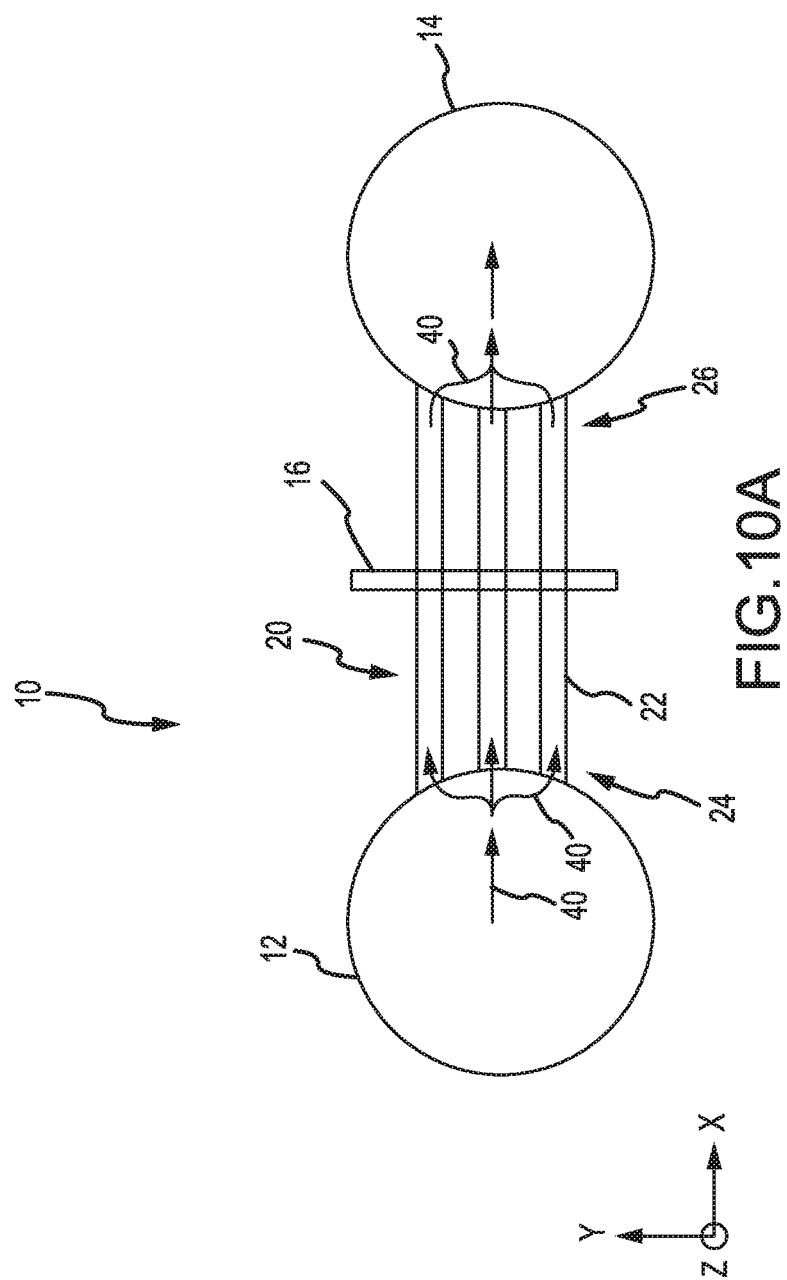

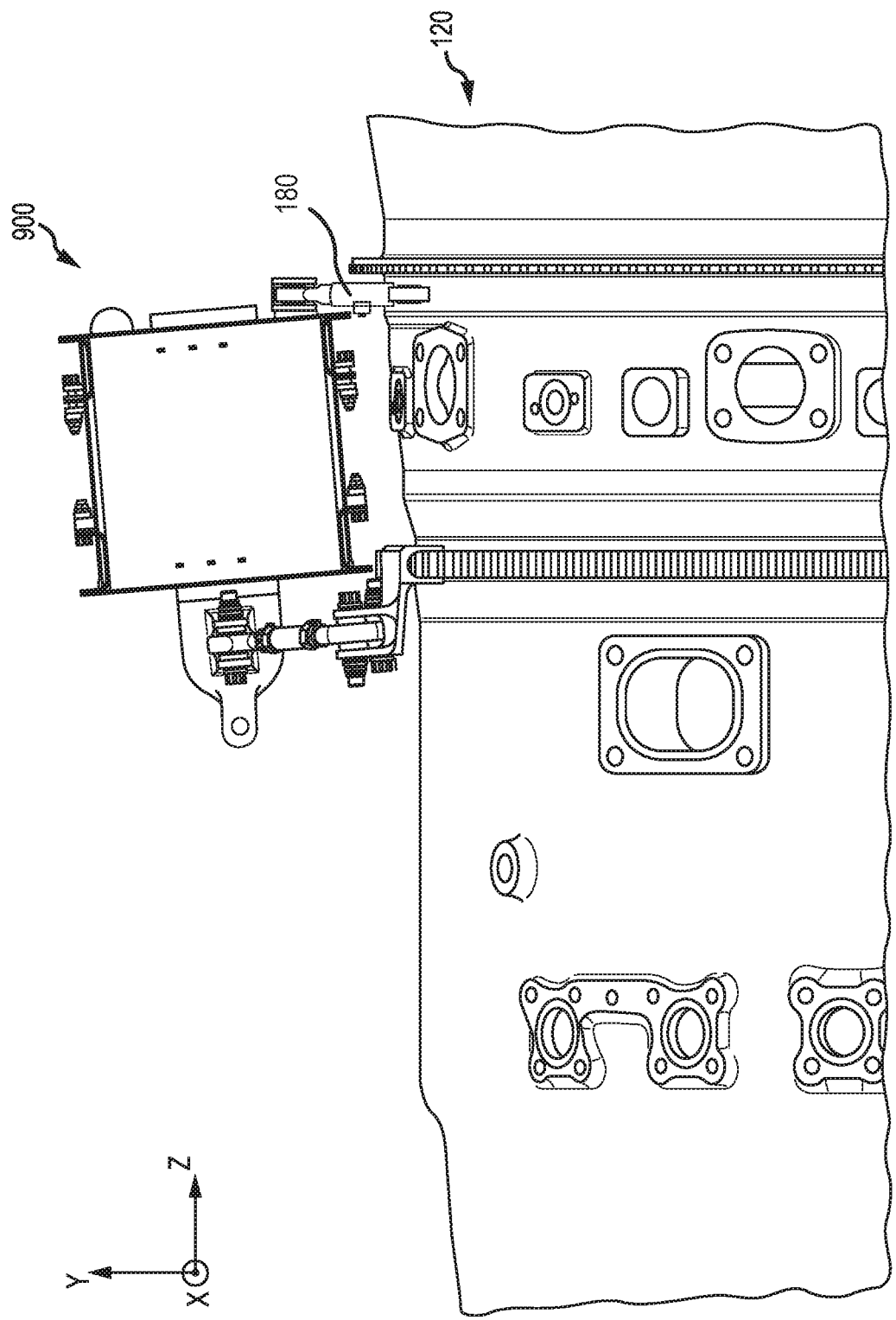

HEAT EXCHANGER FOR COOLED COOLING AIR WITH ADJUSTABLE DAMPER

CROSS REFERENCE TO RELATED APPLICATIONS

This application is a divisional application of and claims priority to U.S. Patent Application, application Ser. No. 15/062,400, filed on Mar. 7, 2016 and entitled "HEAT EXCHANGER FOR COOLED COOLING AIR WITH ADJUSTABLE DAMPER" which is hereby incorporated by reference in its entirety for all purposes. Application Ser. No. 15/062,400 is a continuation in part application of and claims priority to U.S. Patent Application, application Ser. No. 14/826,905, filed on Aug. 14, 2015 and entitled "FOLDED HEAT EXCHANGER FOR COOLED COOLING AIR" which is hereby incorporated by reference in its entirety for all purposes. Application Ser. No. 15/062,400 is a nonprovisional application of and claims priority to U.S. Provisional Patent Application, Application No. 62/278,649, filed on Jan. 14, 2016 and entitled "FOLDED HEAT EXCHANGER FOR COOLED COOLING AIR" which is hereby incorporated by reference in its entirety for all purposes.

STATEMENT OF U.S. GOVERNMENT RIGHTS

This disclosure was made with government support under Contract No. FA8650-09-D2923-0021 issued by the Department of the U.S. Air Force. The government has certain rights in the disclosure.

FIELD

The present disclosure relates to gas turbine engines, and, more specifically, to heat exchangers (HEX) for cooling air of gas turbine engines.

BACKGROUND

As higher pressures are achieved in compressors of gas turbine engines, the temperature of compressed air in and/or leaving the compressors may increase as well. As a result, various components in a gas turbine engine may experience thermal stress. Thus, a heat exchanger (HEX) may be provided to cool hot air in a gas turbine engine. The heat exchanger may experience various loads and modes of vibration relative to the gas turbine engine.

SUMMARY

A heat exchanger for cooling air in a gas turbine engine may comprise: a central manifold comprising an inlet portion, a first outlet portion, and a second outlet portion; a plurality of tubes coupled to the central manifold; a shroud at least partially encasing said plurality of tubes; and a cooling air flow path defined by at least one of the shroud, the plurality of tubes, and an outer surface of the central manifold, wherein the cooling air flow path is orthogonal to said plurality of tubes, the heat exchanger being coupled to the gas turbine engine via a plurality of links; and an adjustable damper coupled between the heat exchanger and the gas turbine engine, the adjustable damper comprising: a first tube, a second tube configured to be inserted at least partially into the first tube, and an adjusting member.

In various embodiments, the adjustable damper may further comprise a moveable member and a spring member coupled between the adjusting member and the moveable member. The adjustable damper may further comprise a housing coupled to the first tube, the spring member and the adjusting member located at least partially within the housing. The moveable member may comprise a contacting surface configured to contact the second tube. The contacting may dampen a movement of the second tube along a longitudinal axis. The adjusting member may be threadingly attached to the housing, the spring member configured to compress in response to the adjusting member being turned into the housing and decompress in response to the adjusting member being turned out of the housing. The first outlet portion may be located on the opposite side of the inlet portion as the second outlet portion. The cooling air flow path may receive air from a bypass flow path of the gas turbine engine. The inlet portion may be configured to receive air from a high pressure compressor section of the gas turbine engine.

A gas turbine engine may comprise: a compressor section; and an air-to-air heat exchanger in fluid communication with the compressor section, comprising: a central manifold comprising an inlet portion, a first outlet portion, and a second outlet portion; a plurality of tubes configured to receive air from the compressor section coupled to the central manifold; a shroud at least partially encasing said plurality of tubes; and a cooling air flow path defined by at least one of the shroud, the plurality of tubes, and an outer surface of the central manifold, wherein the cooling air flow path is orthogonal to said plurality of tubes, wherein, the air-to-air heat exchanger is coupled to the gas turbine engine via an adjustable damper comprising: a first tube; a second tube located at least partially within the first tube; an adjusting member; a moveable member; and a spring member located between the adjusting member and the moveable member.

In various embodiments, the moveable member may comprise a contacting surface, the moveable member being in contact with the second tube via the contacting surface. The adjusting member may be adjustably coupled to a housing. A force may be transferred from the first tube, through the housing, through the adjusting member, through the spring member, into the moveable member, and into the second tube. The force may be configured to dampen a movement of the second tube along a longitudinal axis. The spring member may be configured to at least one of compress or decompress in response to the adjusting member moving relative to the housing. The housing may be attached to the first tube, the moveable member in contact with the second tube via a cut-out in the first tube. The first outlet portion may be located on the opposite side of the inlet portion as the second outlet portion. The inlet portion may receive air from the compressor section of the gas turbine engine and the cooling air flow path receives air from a bypass flow path of the gas turbine engine.

An adjustable damper may comprise: a first tube; a second tube located at least partially within the first tube; a housing coupled to the second tube; a moveable member, the moveable member comprising a contacting surface in contact with the second tube; an adjusting member adjustably coupled to the housing; and a spring member located between the moveable member and the adjusting member, the spring member configured to at least one of compress or decompress in response to the adjusting member moving relative to the housing.

In various embodiments, a force may be transferred from the first tube, through the housing, through the adjusting member, through the spring member, into the moveable member, and into the second tube via the contacting surface for damping a movement of the second tube in a longitudinal direction.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 10A illustrates a cross-section view of a heat exchanger, in accordance with various embodiments;

FIG. 12 illustrates a heat exchanger and a gas turbine engine with an adjustable damper coupled between the heat exchanger and the gas turbine engine, in accordance with various embodiments.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion. As used herein, "gas" and "air" may be used interchangeably.

Fuel efficiency of gas turbine engines is known to be proportional to the ratio of the exit pressure and the inlet pressure of the engine, or overall pressure ratio (OPR). As the OPR increases, the efficiency of the engine generally increases. However, a byproduct of OPR is high operating temperatures in various portions of the engine, such as the high pressure compressor for example. Materials used in gas turbine engines have temperature thresholds which cannot be surpassed for successful operation. Cooling air may be used to decrease operating temperatures of various components in a gas turbine engine. Generally, air from a compressor section of a gas turbine engine is used to cool other sections of the engine. However, as the OPR of gas turbine engines increases, the air from the compressor section may become increasingly hot. A heat exchanger (HEX) may be used to cool the air from a compressor section, thus providing cooled cooling air.

Figure 1:
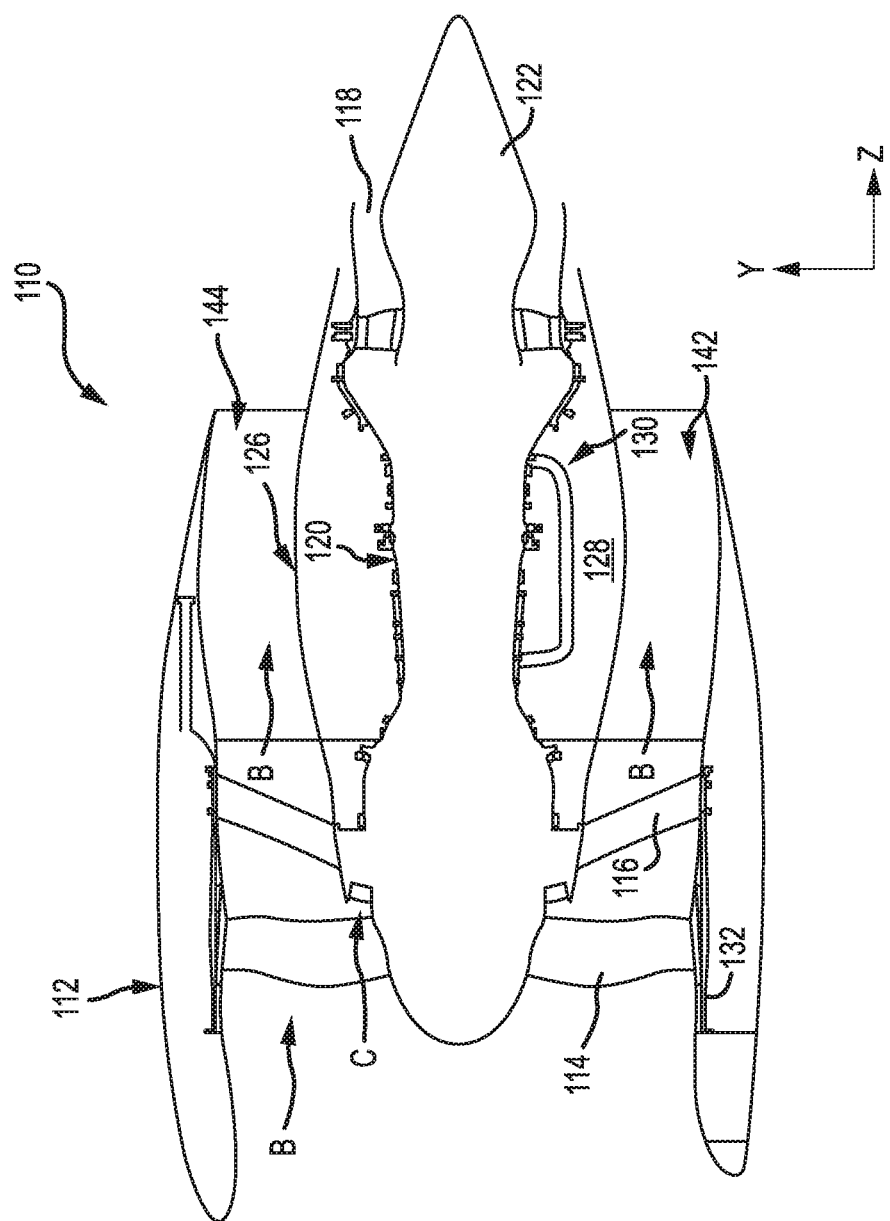
FIG. 1 illustrates a cross-sectional view of an exemplary gas turbine engine, in accordance with various embodiments.

FIG. 1 illustrates a schematic view of a gas turbine engine, in accordance with various embodiments. Gas turbine engine 110 may include core engine 120. Core air flow C flows through core engine 120 and is expelled through exhaust outlet 118 surrounding tail cone 122.

Core engine 120 drives a fan 114 arranged in a bypass flow path B. Air in bypass flow-path B flows in the aft direction (z-direction) along bypass flow-path B. At least a portion of bypass flow path B may be defined by nacelle 112 and inner fixed structure (IFS) 126. Fan case 132 may surround fan 114. Fan case 132 may be housed within fan nacelle 112.

Figure 2:
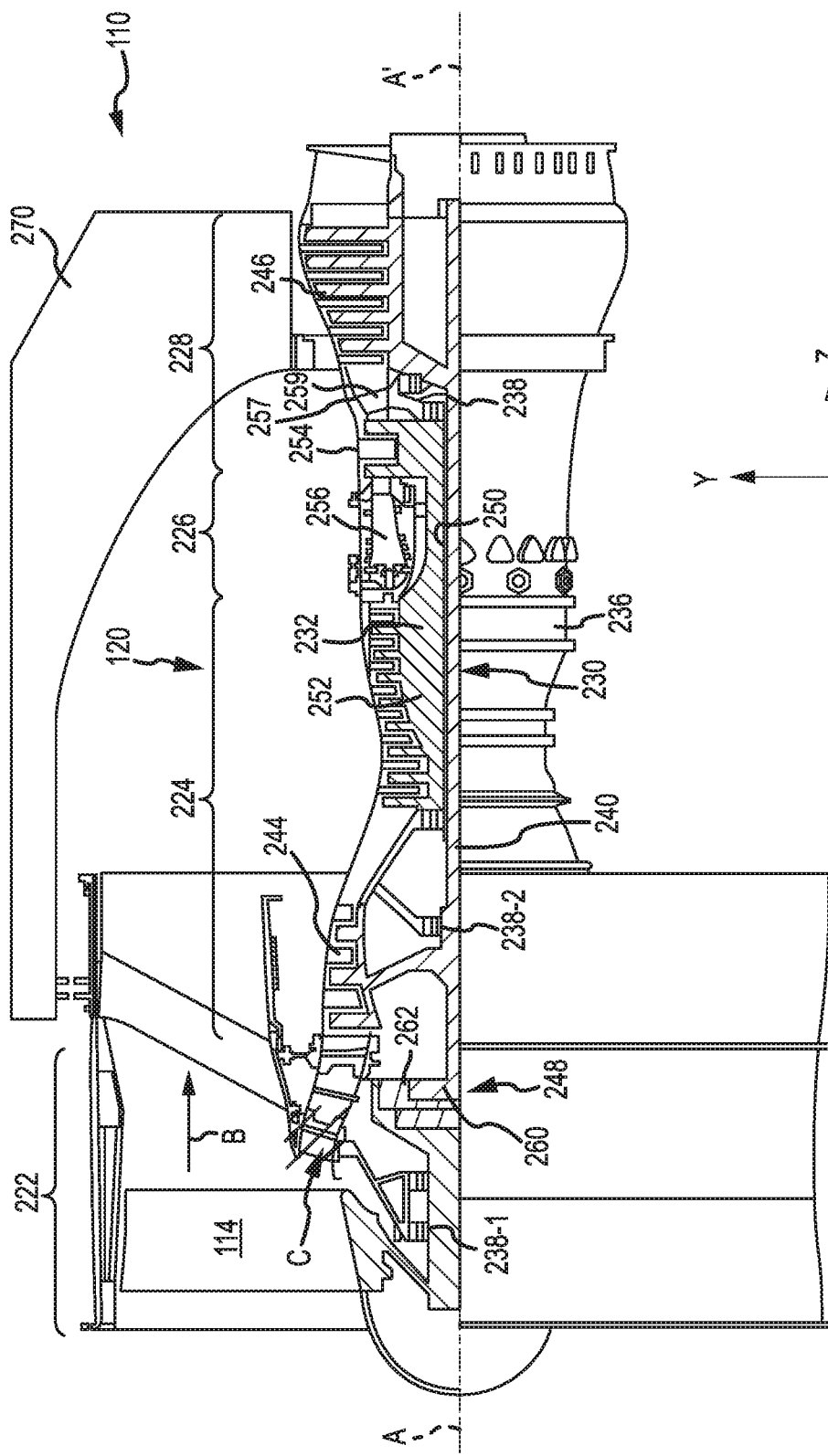
FIG. 2 illustrates a cross-sectional view of an exemplary gas turbine engine, in accordance with various embodiments.

With momentary reference to FIG. 2, nacelle 112 typically comprises two halves which are typically mounted to pylon 270. Fan case structure 233 may provide structure for securing gas turbine engine 110 to a pylon 160. According to various embodiments, multiple guide vanes 116 may extend radially between core engine 120 and IMC 134.

Upper bifurcation 144 and lower bifurcation 142 may extend radially between the nacelle 112 and IFS 126 in locations opposite one another to accommodate engine components such as wires and fluids, for example.

Inner fixed structure 126 surrounds core engine 120 and provides core compartments 128. Various components may be provided in core compartment 128 such as fluid conduits and/or a compressed air duct 130, for example. Compressed air duct 130 may be under high pressure and may supply compressed cooling air from a compressor stage to a high pressure turbine stage, for example. In various embodiments, a heat exchanger may be coupled to compressed air duct 130.

With respect to FIG. 2, elements with like element numbering as depicted in FIG. 1 are intended to be the same and will not necessarily be repeated for the sake of clarity.

In various embodiments and with reference to FIG. 2, a gas turbine engine 110 is provided. Gas turbine engine 110 may be a two-spool turbofan that generally incorporates a fan section 222, a compressor section 224, a combustor section 226 and a turbine section 228. Alternative engines may include, for example, an augmentor section among other systems or features. In operation, fan section 222 can drive air along a bypass flow-path B while compressor section 224 can drive air along a core flow-path C for compression and communication into combustor section 226 then expansion through turbine section 228. Although depicted as a turbofan gas turbine engine 110 herein, it should be understood that the concepts described herein are not limited to use with turbofans as the teachings may be applied to other types of turbine engines including three-spool architectures.

Gas turbine engine 110 may generally comprise a low speed spool 230 and a high speed spool 232 mounted for rotation about an engine central longitudinal axis A-A' relative to an engine static structure 236 via one or more bearing systems 238 (shown as bearing system 238-1 and bearing system 238-2 in FIG. 2). It should be understood that various bearing systems 238 at various locations may alternatively or additionally be provided including, for example, bearing system 238, bearing system 238-1, and bearing system 238-2.

Low speed spool 230 may generally comprise an inner shaft 240 that interconnects a fan 114, a low pressure (or first) compressor section 244 and a low pressure (or first) turbine section 246. Inner shaft 240 may be connected to fan 114 through a geared architecture 248 that can drive fan 114 at a lower speed than low speed spool 230. Geared architecture 248 may comprise a gear assembly 260 enclosed within a gear housing 262. Gear assembly 260 couples inner shaft 240 to a rotating fan structure. High speed spool 232 may comprise an outer shaft 250 that interconnects a high-pressure compressor ("HPC") 252 (e.g., a second compressor section) and high pressure (or second) turbine section 254. A combustor 256 may be located between HPC 252 and high pressure turbine 254. A mid-turbine frame 257 of engine static structure 236 may be located generally between high pressure turbine 254 and low pressure turbine 246. Mid-turbine frame 257 may support one or more bearing systems 238 in turbine section 228. Inner shaft 240 and outer shaft 250 may be concentric and rotate via bearing systems 238 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 244 then HPC 252, mixed and burned with fuel in combustor 256, then expanded over high pressure turbine 254 and low pressure turbine 246. Mid-turbine frame 257 includes airfoils 259 which are in the core airflow path. Low pressure turbine 246 and high pressure turbine 254 rotationally drive the respective low speed spool 230 and high speed spool 232 in response to the expansion.

Gas turbine engine 110 may be, for example, a high-bypass geared aircraft engine. In various embodiments, the bypass ratio of gas turbine engine 110 may be greater than about six (6). In various embodiments, the bypass ratio of gas turbine engine 110 may be greater than ten (10). In various embodiments, geared architecture 248 may be an epicyclic gear train, such as a star gear system (sun gear in meshing engagement with a plurality of star gears supported by a carrier and in meshing engagement with a ring gear) or other gear system. Geared architecture 248 may have a gear reduction ratio of greater than about 2.3 and low pressure turbine 246 may have a pressure ratio that is greater than about 5. In various embodiments, the bypass ratio of gas turbine engine 110 is greater than about ten (10:1). In various embodiments, the diameter of fan 114 may be significantly larger than that of the low pressure compressor 244, and the low pressure turbine 246 may have a pressure ratio that is greater than about 5:1. Low pressure turbine 246 pressure ratio may be measured prior to inlet of low pressure turbine 246 as related to the pressure at the outlet of low pressure turbine 246 prior to an exhaust nozzle. It should be understood, however, that the above parameters are exemplary of various embodiments of a suitable geared architecture engine and that the present disclosure contemplates other gas turbine engines including direct drive turbofans. FIG. 1 and FIG. 2 provide a general understanding of the sections in a gas turbine engine, and is not intended to limit the disclosure. The present disclosure may extend to all types of turbine engines, including turbofan gas turbine engines and turbojet engines, for all types of applications.

Figure 3:
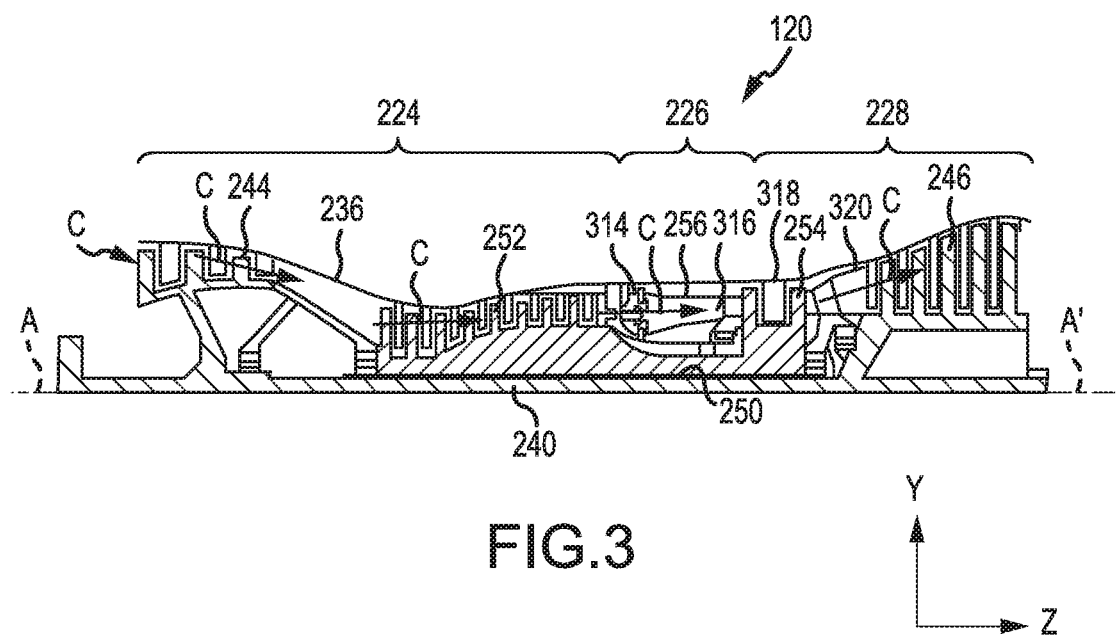
FIG. 3 illustrates the primary-flow gas path in a gas turbine engine through the low pressure compressor, high-pressure compressor, combustor, high-pressure turbine, and low-pressure turbine, in accordance with various embodiments.

With respect to FIG. 3, elements with like element numbering as depicted in FIG. 1 and FIG. 2 are intended to be the same and will not necessarily be repeated for the sake of clarity.

FIG. 3 illustrates the primary flow gas path through core engine 110, in accordance with various embodiments. Core engine 110 may include engine static structure 236, low-pressure compressor 244, high-pressure compressor 252, combustor 256, high-pressure turbine 254, and low-pressure turbine C. Engine static structure 236 may be referred to as an engine case. Gas may flow into low-pressure compressor 244 along gas path C. Gas flowing through low-pressure compressor 244 along gas path C may be compressed, resulting in an increase in pressure and temperature relative to the pressure and temperature upon entering low-pressure compressor 244. Gas may flow into high-pressure compressor 252 along gas path C. Gas flowing through high-pressure compressor 252 along gas path C may be compressed, resulting in an increase in pressure and temperature relative to the pressure and temperature upon entering high-pressure compressor 252. Uncombusted gas in gas path C leaving high-pressure compressor 252 may be referred to as T3 gas. T3 gas may have a varying temperature at different engine speeds. The temperature of T3 gas may be about 400° F. (205° C.) when core engine 110 is at idle speeds and may reach about 1,400° F. (760° C.) or higher as core engine 110 accelerates for takeoff, where the term "about" in this context only may refer to +/−200° F. (+/−93.3° C.). Different engines may have higher temperatures or lower temperatures at each stage. T3 gas may be present at location 314 of core engine 110. T3 gas leaving the high-pressure compressor 252 may then flow into combustor 256 to supply combustor 256 with air for combustion.

In various embodiments, uncombusted T3 gas may be mixed with fuel and burned in combustor 256. Combusted gas in combustor 256 may be referred to as T4 gas. T4 gas may leave combustor 256 and enter high-pressure turbine 254. T4 gas may reach or exceed temperatures of up to 3,500° F. (1,925° C.) or higher. T4 gas may be located at location 316, for example. T4 gas leaving combustor may follow gas path C to drive high-pressure turbine 254.

In various embodiments, combusted gas that has entered, but not exited, high-pressure turbine 254 may be identified as T4.25 gas. T4.25 gas may be significantly cooler than T4 gas exiting combustor 256. For example, T4.25 gas may be at temperatures of about 1,000° F.-2,000° F. (537° C.-1,093° C.), where the term "about" in this context only may refer to +/−500° F. (+/−260° C.). T4.25 gas may be located at location 318, for example. The T4.25 gas then follows out high-pressure turbine 254 and into low-pressure turbine 246 along gas path C.

In various embodiments, combusted gas exiting high-pressure turbine 254 and entering low-pressure turbine 246 may be referred to as T4.5 gas. T4.5 gas may be cooler than T4.25 gas found in the high-pressure compressor or T4 gas exiting the combustor. For example, T4.5 gas may be about 1,500° F. (815° C.) degrees at idle, where the term "about" in this context only may refer to +/−500° F. (+/−260° C.). T4.5 gas may be located at location 320 in gas path C, for example. The T4.5 gas then follows gas path C into low-pressure turbine 246.

Figure 4:
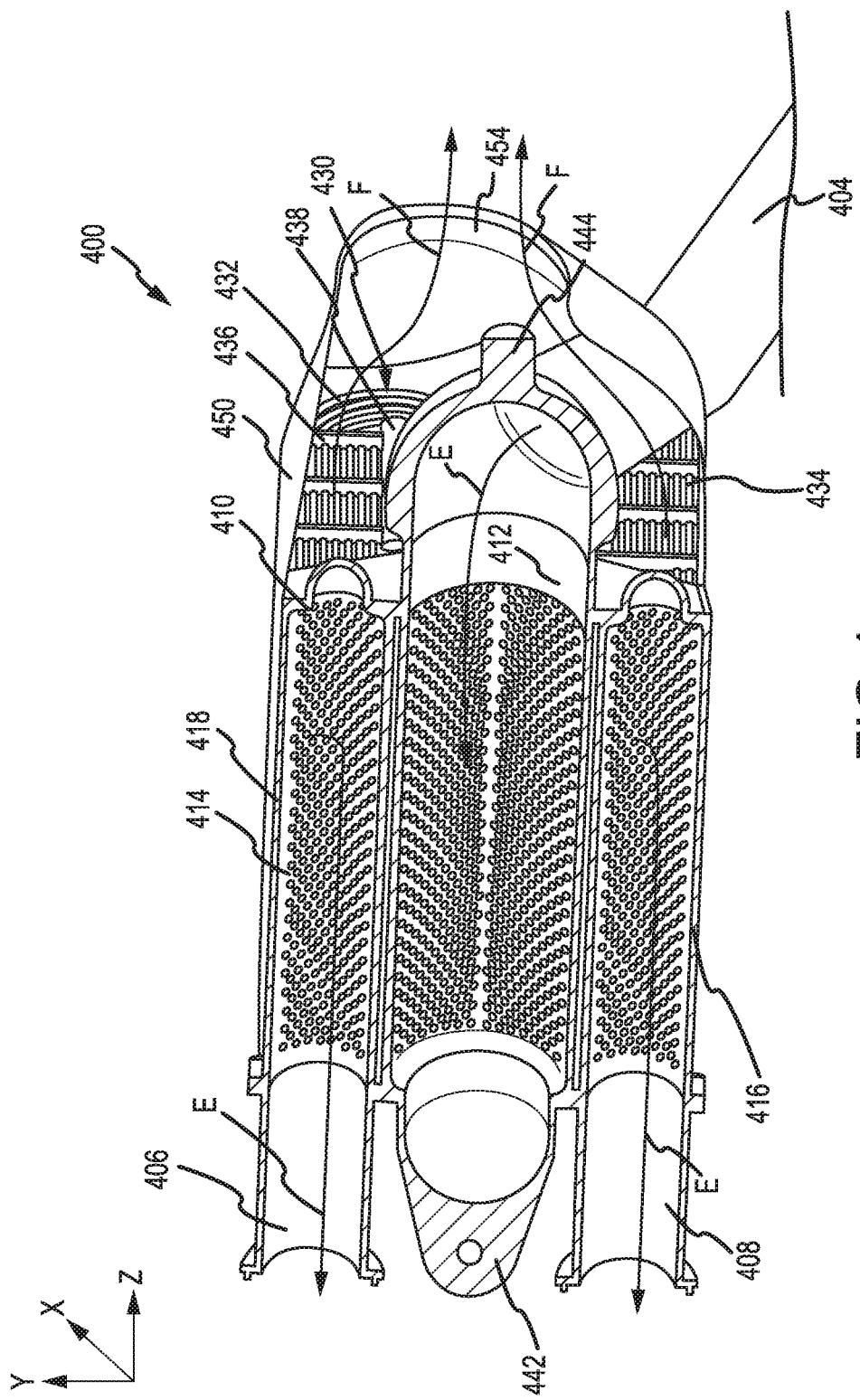
FIG. 4 illustrates a cross-sectional view of a heat exchanger, in accordance with various embodiments.

With reference to FIG. 4, a cross-section view of a heat exchanger (HEX) 400 is illustrated. An x-y-z axis is provided for ease of illustration. In various embodiments, HEX 400 may comprise a central manifold 410 and a plurality of tubes 430. In various embodiments, central manifold 410 may comprise an inlet portion 412, a first outlet portion 414, and a second outlet portion 416. In various embodiments, first outlet portion 414 may be located on the opposite side of inlet portion 412 as second outlet portion 416. In various embodiments, first outlet portion 414 may be located adjacent to inlet portion 412 (in the positive y-direction). In various embodiments, second outlet portion 416 may be located adjacent to inlet portion 412 (in the negative y-direction). In various embodiments, inlet portion 412, first outlet portion 414, and second outlet portion 416 may each individually define a cylindrical void. In various embodiments, HEX 400 may further comprise a shroud 450. In various embodiments, shroud 450 may be coupled to central manifold 410. Shroud 450 may at least partially encase central manifold 410 and tubes 430.

In various embodiments, a plurality of baffles, such as baffle 436 for example, may be coupled to plurality of tubes 430. Baffle 436 may comprise a plurality of apertures into which plurality of tubes 430 are inserted. Baffle 436 may add to the stiffness of plurality of tubes 430. In various embodiments, with momentary reference to FIG. 1, the number of baffles installed over plurality of tubes 430 may be determined by the highest operating frequency of gas turbine engine 110. For example, baffles, such as baffle 436 may be installed over plurality of tubes 430 until the natural frequency of plurality of tubes 430 is higher than the highest operating frequency of gas turbine engine 110. In various embodiments, a baffle support 438 may be coupled to baffle 436.

With reference now to FIG. 3 and FIG. 4, in various embodiments, central manifold 410 and/or plurality of tubes 430 may be made of a high performance nickel-chromium alloy such as an austenitic nickel-chromium-based superalloy (e.g., INCONEL or HAYNES 282), metals, ceramics, or other materials suitable to withstand T3 gas temperatures that may exceed 1,100° F. (593° C.) degrees when core engine 120 is operating at takeoff speeds.

With respect to FIG. 5, FIG. 6, FIG. 7A, FIG. 7B, and FIG. 8, elements with like element numbering as depicted in FIG. 4 are intended to be the same and will not necessarily be repeated for the sake of clarity.

Figure 5:
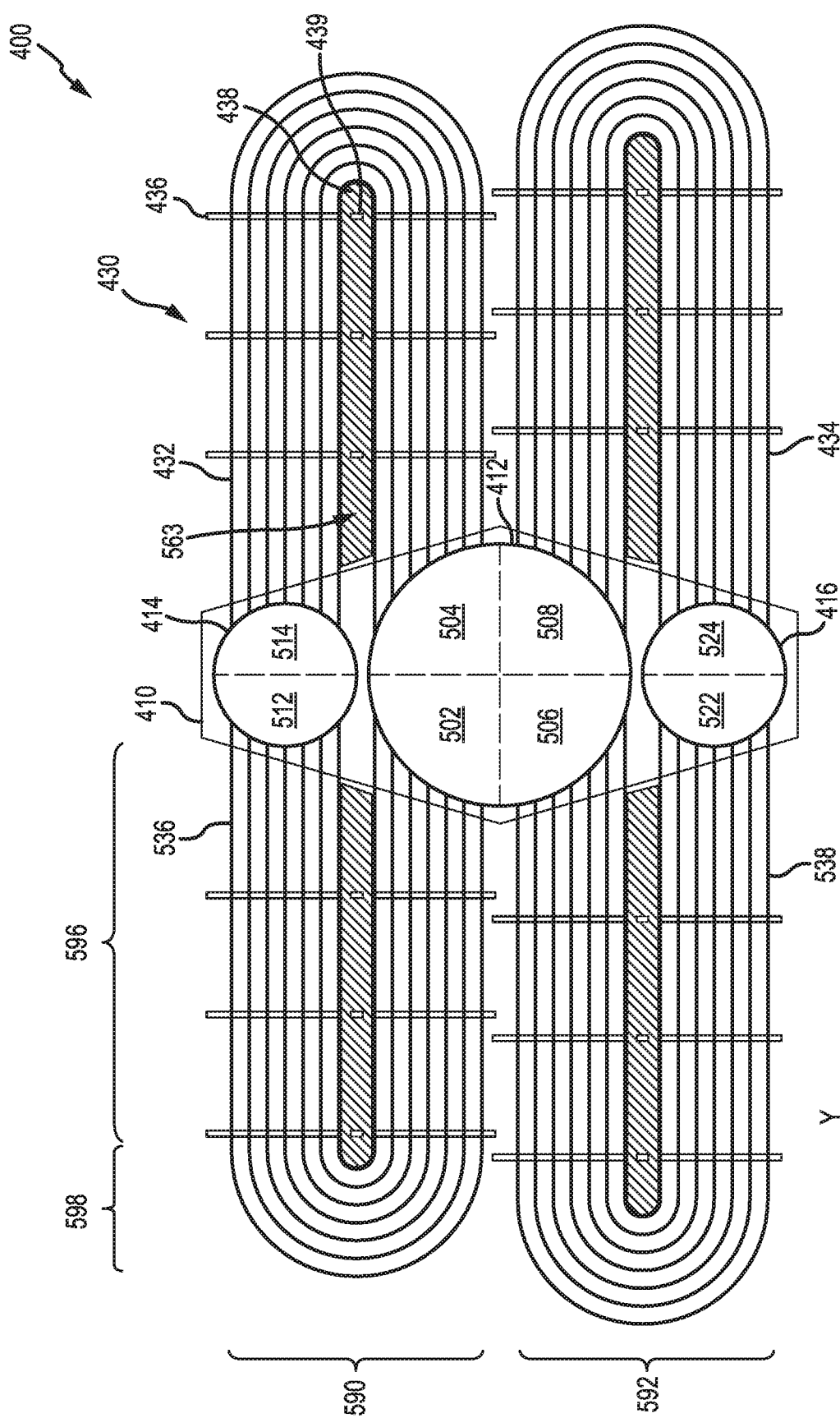
FIG. 5 illustrates a cross-sectional view of a heat exchanger, in accordance with various embodiments.

With reference now to FIG. 5, inlet portion 412 may comprise four quadrants including quadrant 502 (also referred to herein as "first quadrant"), quadrant 504 (also referred to herein as "second quadrant"), quadrant 506 (also referred to herein as "third quadrant"), and quadrant 508 (also referred to herein as "fourth quadrant"). First outlet portion 414 may comprise first half 512 and second half 514. Second outlet portion 416 may comprise first half 522 and second half 524. In various embodiments, a plurality of tubes, including tube 432, may be coupled between quadrant 504 of inlet portion 412 and second half 514 of first outlet portion 414. In various embodiments, a plurality of tubes, including tube 434, may be coupled between quadrant 508 of inlet portion 412 and second half 524 of second outlet portion 416. In various embodiments, a plurality of tubes, including tube 536, may be coupled between quadrant 502 of inlet portion 412 and first half 512 of first outlet portion 414. In various embodiments, a plurality of tubes, including tube 538, may be coupled between quadrant 506 of inlet portion 412 and first half 522 of second outlet portion 416. Accordingly, inlet portion 412 may be in fluid communication with first outlet portion 414 and in fluid communication with second outlet portion 416. In various embodiments, central manifold 410 may comprise a hexagonal geometry as illustrated in FIG. 5. In various embodiments, central manifold 410 may comprise an octagonal, square, ovular, elliptical, and/or any other geometry.

In various embodiments, as illustrated in FIG. 5, tube 536 may comprise a straight portion 596 and a rounded portion 598. Accordingly, tube 536 may be folded, in half for example. Thus, HEX may be referred to as having a folded tube design.

In various embodiments, plurality of tubes 430 may comprise an upper stack (also referred to herein as "first stack") 590 and a lower stack (also referred to herein as a "second stack") 592. In various embodiments, with momentary reference to FIG. 4 and FIG. 8, baffle support 438 may be configured to block air in cooling air flow path F from entering the void 563 located in the middle of upper stack 590 of plurality of tubes 430. In various embodiments, baffle support 438 may provide support for a plurality of baffles such as baffle 436. In various embodiments, baffle support 438 may comprise a plurality of apertures, such as aperture 439, through which at least a portion of a plurality of baffles, such as a portion of baffle 436, may be inserted and coupled to baffle support 438. In various embodiments, baffle support 438 may be welded, soldered, brazed, or otherwise suitably coupled to baffle 436. One or more baffle supports may be located within the void in the middle of lower stack 592 in a similar manner as baffle support 438.

With reference now to FIG. 4, inlet portion 412 may include a first attachment feature 442 and a second attachment feature 444. In various embodiments, first attachment feature 442 may define a hemispherical void. In various embodiments, second attachment feature 444 may define a hemispherical void. In various embodiments, first attachment feature 442 may be detachably coupled to inlet portion 412. In various embodiments, first attachment feature 442 may be permanently coupled to inlet portion 412. For example, first attachment feature 442 may be welded, soldered, brazed, or otherwise suitably coupled to inlet portion 412. In various embodiments, second attachment feature 444 may be detachably coupled to inlet portion 412. In various embodiments, second attachment feature 444 may be permanently coupled to inlet portion 412. For example, second attachment feature 444 may be welded, soldered, brazed, or otherwise suitably coupled to inlet portion 412.

In various embodiments, air may enter HEX 400 via inlet tube 404. In various embodiments, HEX 400 may be coupled via inlet tube 404 to a high pressure compressor such as high-pressure compressor 252 of FIG. 2 and FIG. 3. Accordingly, HEX 400 may be in fluid communication via inlet portion 412 with a compressor section 224 of a gas turbine engine. In various embodiments, HEX 400 may be coupled via inlet tube 404 to a compressor section, combustor section, and/or a turbine section of a gas turbine engine. In various embodiments, HEX 400 may be coupled to any portion of a gas turbine engine.

In various embodiments, HEX 400 may comprise hot air flow path E. Hot air flow path E may be defined by inlet portion 412, plurality of tubes 430, first outlet portion 414, and/or second outlet portion 416. Upon entering inlet portion 412 via inlet tube 404, air may follow hot air flow path E and enter the plurality of tubes 430 from inlet portion 412 and then exit the plurality of tubes 430 into one of first outlet portion 414 and/or second outlet portion 416. For example, air may enter inlet portion 412, then enter tube 432, next it may exit tube 432 into first outlet portion 414, and finally exit first outlet portion 414 via first outlet tube 406. In a further example, air may enter inlet portion 412, then enter tube 434, next it may exit tube 434 into second outlet portion 416, and finally exit second outlet portion 416 via second outlet tube 408. Air exiting either first outlet portion 414 or second outlet portion 416 may be used to cool various portions of a gas turbine engine. In various embodiments, while in plurality of tubes 430, air in hot air flow path E may transfer heat to air in cooling air flow path F.

In various embodiments, inner surface 454 of shroud 450 may at least partially define a cooling air flow path F. Outer surface 418 of central manifold 410 may at least partially define cooling air flow path F. The outer surface of the plurality of tubes 430 may at least partially define cooling air flow path F. In various embodiments, air from bypass flow path 124 of FIG. 1 may enter cooling air flow path F. In various embodiments, air in cooling air flow path F may flow generally in an aft direction (positive z-direction). In various embodiments, heat from air in the plurality of tubes 430 may be transferred to air in cooling air flow path F. In various embodiments, the transfer of heat may occur in a convective manner. Accordingly, the temperature of air in inlet portion 412 may be greater than the temperature of air in first outlet portion 414 and second outlet portion 416. In various embodiments, the flow of air in plurality of tubes 430 may be orthogonal to the flow of air in cooling air flow path F. Thus, the flow of air in tubes 430 and the flow of air in cooling air flow path F may comprise a cross-flow. Accordingly, plurality of tubes 430 may extend in a direction which is orthogonal to cooling air flow path F.

In various embodiments, a pressure gradient may exist between air in hot air flow path E and cooling air flow path F. In various embodiments, as previously mentioned, inlet portion 412, first outlet portion 414, and second outlet portion 416 may each individually define a cylindrical void as shown in FIG. 4 and FIG. 5. In various embodiments, air pressure in inlet portion 412 may reach up to 500 pounds per square inch absolute (500 psia) (3,447,378.6 Pascal) or more, while air pressure in cooling air flow path F may generally vary between 14.7 psia (101,352.9 Pascal) and 21 psia (144,789.9 Pascal). In various embodiments, the cylindrical geometry of inlet portion 412, first outlet portion 414, and second outlet portion 416 may be ideal to handle the amount of pressure experienced by these portions. In various embodiments, air entering hot air flow path E may reach temperatures of about 1,400° F. (760° C.) or higher. In various embodiments, with reference to FIG. 3, air entering hot air flow path E may comprise T3 gas. In various embodiments, air entering cooling air flow path F may reach temperatures of about 100° F. (38° C.) or higher. In various embodiments, air entering cooling air flow path F may comprise engine bypass air. In various embodiments, engine bypass air may comprise air from bypass flow path 124 of FIG. 1.

Figure 8:
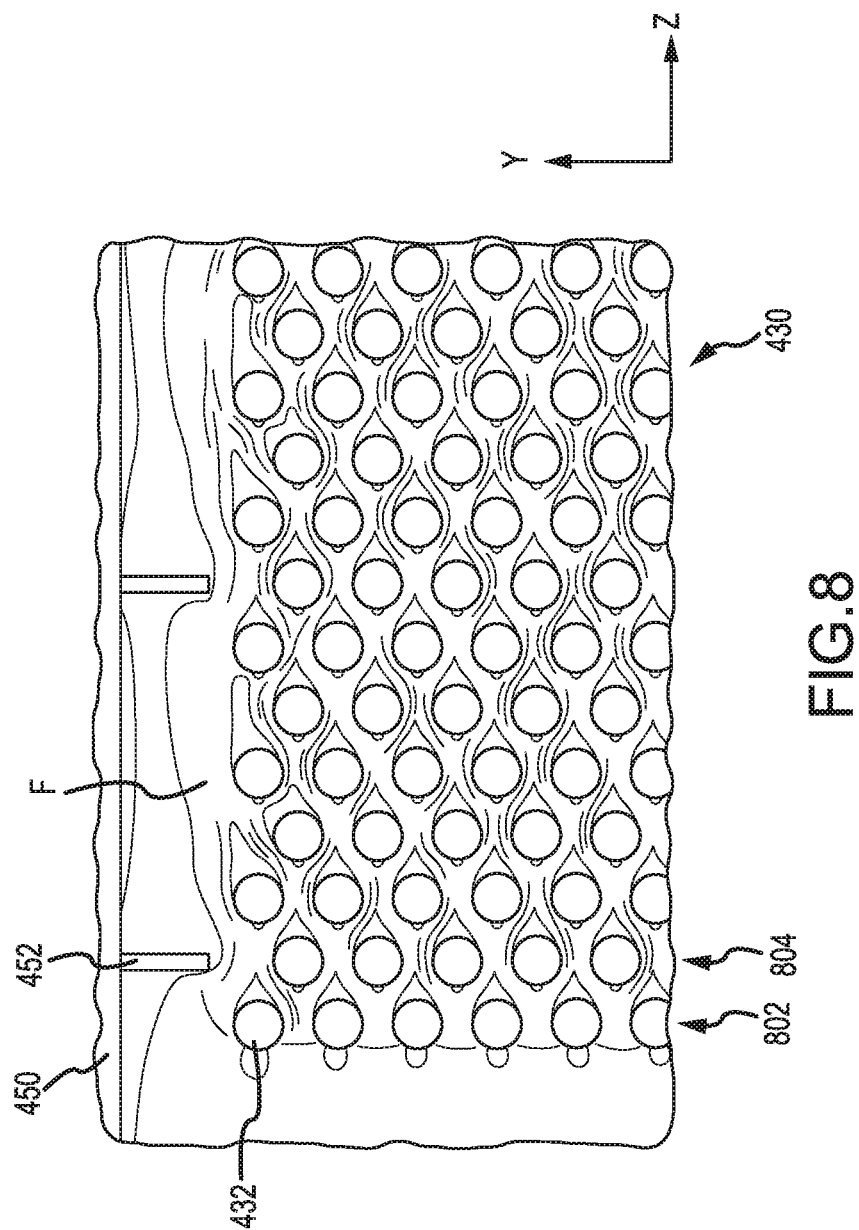
FIG. 8 illustrates a cross-sectional view of a cooling air flow path through heat exchanger tubes installed in an alternating manner, in accordance with various embodiments.

With reference to FIG. 8, cross-section view of plurality of tubes 430 installed in an alternating manner with a detailed view of cooling air flow path F is illustrated, according to various embodiments. An x-y-z axis is provided for ease of illustration. In various embodiments, plurality of tubes 430 may be installed in an alternating manner. For example, column 804 of plurality of tubes 430 may be offset (in the y-direction) from column 802 such that column 804 is not directly behind (in the z-direction) column 802. Installing tubes 430 in an alternating manner may aide in more efficiently transferring heat from air in plurality of tubes 430 to air in flow path F.

In various embodiments, shroud 450 may include flow tab 452. In various embodiments, flow tab 452 may comprise a tab or panel. In various embodiments, flow tab 452 may be configured to contain cooling air flow path F in close proximity to plurality of tubes 430 which may aide in more efficiently transferring heat from air in plurality of tubes 430 to air in flow path F.

Figure 6:
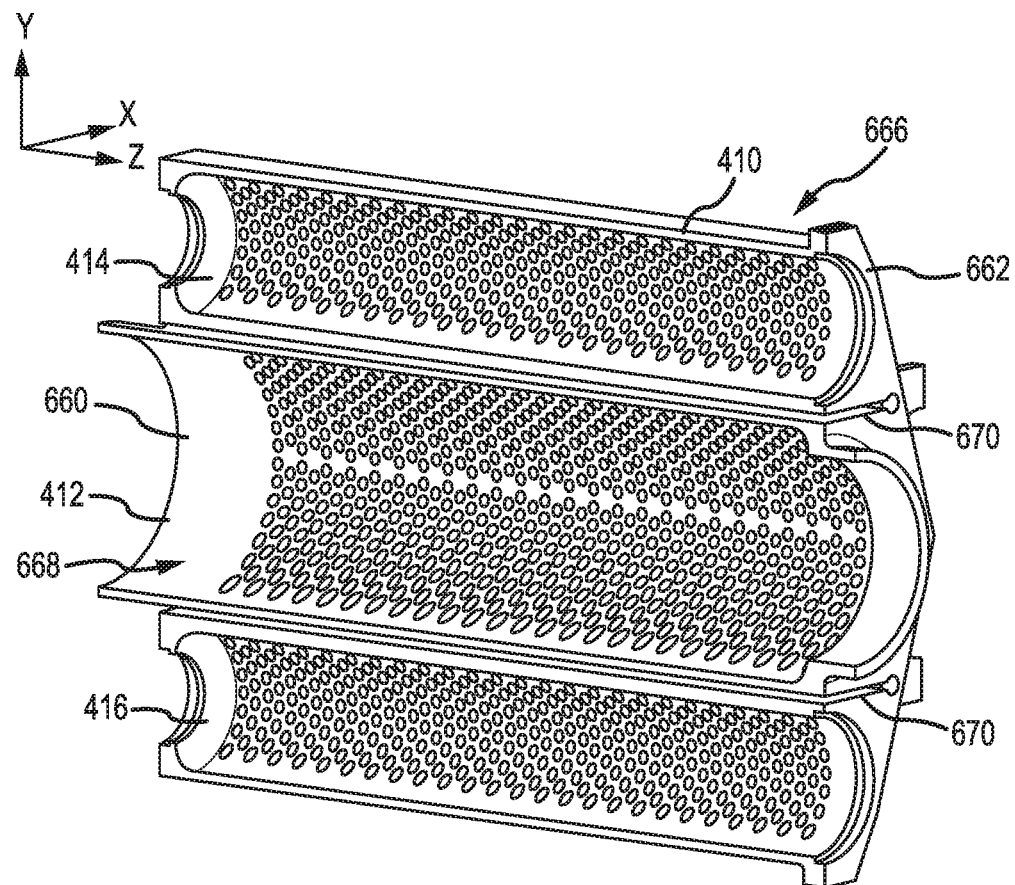
FIG. 6 illustrates a cross-sectional view of a central manifold, in accordance with various embodiments.

With reference to FIG. 6, a cross-section view of a central manifold 410 is illustrated. An x-y-z axis is provided for ease of illustration. In various embodiments, central manifold 410 may comprise one or more relief cuts 670. Relief cut 670 may be located between inlet portion 412 and first outlet portion 414. Relief cut 670 may be located between inlet portion 412 and second outlet portion 416. Relief cut 670 may be configured to relieve stress from central manifold 410 as central manifold 410 expands and contracts in response to an increase and decrease in temperature respectively. In various embodiments, central manifold 410 may comprise a plurality of apertures 660 such as aperture 662 for example. With momentary reference to FIG. 4, plurality of apertures 660 may be configured to receive plurality of tubes 430. Plurality of tubes 430 may be inserted from an outer surface 666 of central manifold 410 to an inner surface 668 of central manifold 410 in the x-direction. In various embodiments, plurality of tubes 430 may be detachably coupled to central manifold 410. In various embodiments, plurality of tubes 430 may be permanently coupled to central manifold 410. For example, tube 432 may be welded, soldered, brazed, or otherwise suitably coupled to central manifold 410 via aperture 662. In various embodiments, plurality of tubes 430 may be flush with inner surface 668 when in an installed position. In various embodiments, plurality of tubes 430 may protrude radially inward from inner surface 668 when in an installed position.

Figure 7A:
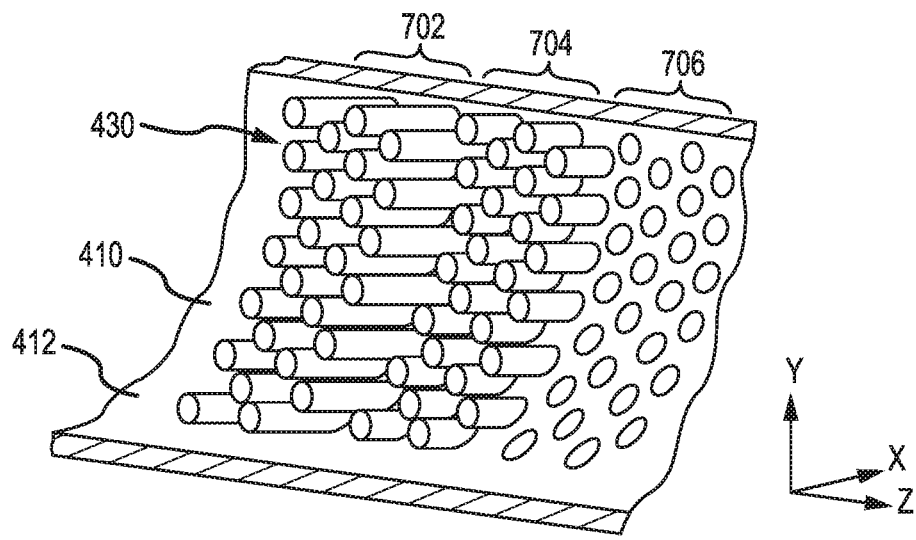
FIG. 7A illustrates a cross-sectional view of part of a central manifold with tubes installed in a stepped manner, in accordance with various embodiments.
Figure 7B:
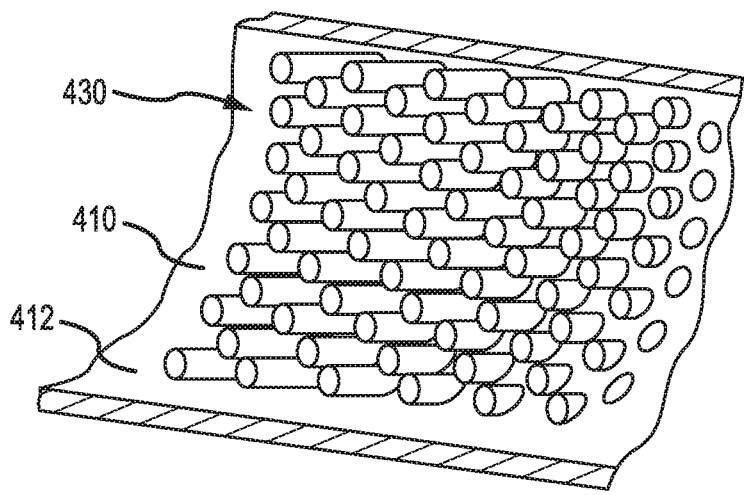
FIG. 7B illustrates a cross-sectional view of part of a central manifold with tubes installed with a smooth change in radial position, in accordance with various embodiments.

With reference to FIG. 7A, plurality of tubes 430 are illustrated in an installed position in a stepped fashion, according to various embodiments. Plurality of tubes 430 may comprise various sections of tubes, each installed at different radial positions. For example, plurality of tubes 430 may comprise various sections of tubes such as section 702, section 704, and section 706. In various embodiments, section 702 may protrude further radially inward than section 704. In various embodiments, section 704 may protrude further radially inward than section 706. In various embodiments, with momentary reference to FIG. 7B, plurality of tubes 430 may comprise a gradual or smooth change in radial position as illustrated in FIG. 7B, as opposed to a stepped change as illustrated in FIG. 7A. In various embodiments, inlet portion 412 may comprise a pressure gradient along the axial direction (z-direction). Installing plurality of tubes 430 in a stepped fashion may compensate for such pressure gradient resulting in a more uniform flow through plurality of tubes 430. In various embodiments, plurality of tubes 430 may be pre-cut to size before installing into central manifold 410. In various embodiments, plurality of tubes 430 may be installed into central manifold 410 and then cut to length when in the installed position. For example, each tube of plurality of tubes 430 may comprise a similar length, installed into central manifold 410, and then cut to various lengths according to pre-determined specifications. In various embodiments, one or more orifices may be coupled to an inlet of plurality of tubes 430 in order to meter the flow of air through plurality of tubes 430.

In various embodiments, each tube included in plurality of tubes 430 may comprise a physical flow area which is less than 5% of the flow area of inlet portion 412. With further reference to FIG. 4, inlet portion 412 may comprise inner diameter 478, where the flow area of inlet portion 412 is calculated as $\pi$ times one fourth times inner diameter 478 squared, or $(\pi/4)*(\text{inner diameter } 478)^2$. Similarly, the inner diameter of each tube included in plurality of tubes 430 may comprise a flow area. For example, according to various embodiments, tube 432 may comprise a flow area which is less than 5% of the flow area of inlet portion 412. In various embodiments, tube 432 may comprise a flow area in the range from about 1% to about 7% of the flow area of inlet portion 412, wherein the term "about" in this context can only mean +/−1%. Minimizing the flow area of tube 432 may allow room for more tubes to be included in plurality of tubes 430, thus increasing the overall surface area of plurality of tubes 430. Increasing the overall surface area of plurality of tubes 430 may increase the rate at which heat may be transferred from air in plurality of tubes 430 to air in cooling air flow path F. Similarly, the flow area of first outlet portion 414 and the flow area of second outlet portion 416 may be less than the flow area of inlet portion 412.

In various embodiments, HEX 400 may be configured such that the flow area of inlet portion 412 is equal to the flow area of first outlet portion 414 and the flow area of second outlet portion 416. In various embodiments, two outlets may enable the length of plurality of tubes 430 to be decreased while maintaining similar heat transfer between hot air flow path E and cooling air flow path F, in comparison with a single outlet design. A pressure drop (or difference) may exist between inlet portion 412 and both first outlet portion 414 and second outlet portion 416. In various embodiments, splitting the flow of hot air flow path E in half between first outlet portion 414 and second outlet portion 416 may decrease the pressure drop between the inlet and outlet by half, in comparison with a single outlet design. Stated another way, having two outlets, with hot air flow path E split between the two outlets via plurality of tubes 430, may decrease the pressure drop between inlet portion 412 and outlet portions 414, 416 by half. It may be desirable to decrease the pressure drop between the inlet and outlet of HEX 400 in order to prevent reverse flow or stagnated flow through HEX 400.

Figure 9:
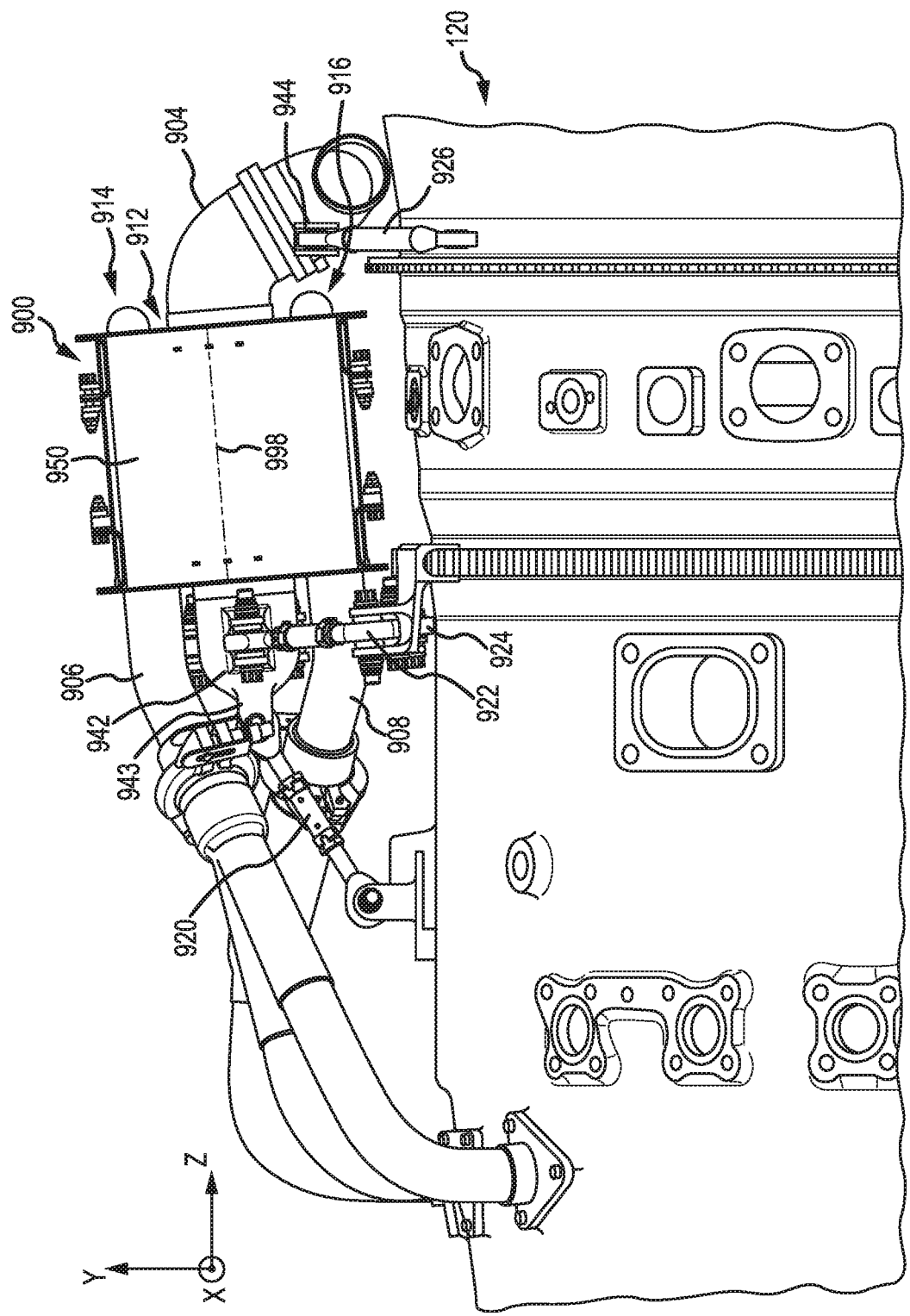
FIG. 9 illustrates a perspective view of a heat exchanger installed on a gas turbine engine, in accordance with various embodiments.

With respect to FIG. 9 a heat exchanger (HEX) installed on a gas turbine engine is illustrated, in accordance with various embodiments. In various embodiments, HEX 900 may be similar to HEX 400 as illustrated in FIG. 4. In various embodiments, HEX 900 may comprise an inlet portion 912, first outlet portion 914, second outlet portion 916, and a plurality of tubes (not shown in FIG. 9). HEX 900 may further comprise shroud 950. Inlet tube 904 may be coupled to inlet portion 912 of HEX 900. First outlet tube 906 may be coupled to first outlet portion 914 of HEX 900. Second outlet tube 908 may be coupled to second outlet portion 916 of HEX 900.

In various embodiments, HEX 900 may be coupled to core engine 120 via first attachment feature 942 and second attachment feature 944. In various embodiments, first attachment feature 942 may be similar to first attachment feature 442 as illustrated in FIG. 4. In various embodiments, second attachment feature 944 may be similar to second attachment feature 444 as illustrated in FIG. 4. In various embodiments, first attachment feature 942 may be coupled to core engine 120 via one or more links, such as first link 920 for example. In various embodiments, first link 920 may be a turnbuckle link. FIG. 9 illustrates first attachment feature 942 comprising a plurality of tabs, such as tab 943 for example. A bolt or fastener may be inserted through one or more apertures in link 920 and one or more apertures in tab 943 to couple link 920 and first attachment feature 942. First link 920 may extend generally in the z-direction. Second link 922 and third link 924 may be coupled to first attachment feature in a similar manner as first link 920. Second link 922 may extend away from first attachment feature 942 generally in the negative x-direction. Third link 924 may extend away from first attachment feature 942 generally in the positive x-direction. Accordingly, first attachment feature may be fixed in space. Stated another way, first attachment feature may be fixed in the x, y, and z-directions.

In various embodiments, second attachment feature 944 may be coupled to core engine 120. Second attachment feature 944 may be coupled to core engine 120 via fourth link 926. In various embodiments, second attachment feature 944 may be coupled to core engine 120 such that second attachment feature 944 may be free to move in the z-direction. Accordingly, second attachment feature 944 may be configured to freely expand away from or contract towards first attachment feature 942 with HEX 900 in response to an increase or decrease in temperature, respectively. In various embodiments, with momentary reference to FIG. 2, centerline 998 of HEX 900 may be oriented at an angle in the range from about zero degrees (0°) to about five degrees (5°), wherein the term "about" in this context can only mean +/−3°. In various embodiments, centerline 998 of HEX 900 may be oriented at an angle of about five degrees (5°), wherein the term "about" in this context can only mean +/−2°.

Figure 11:
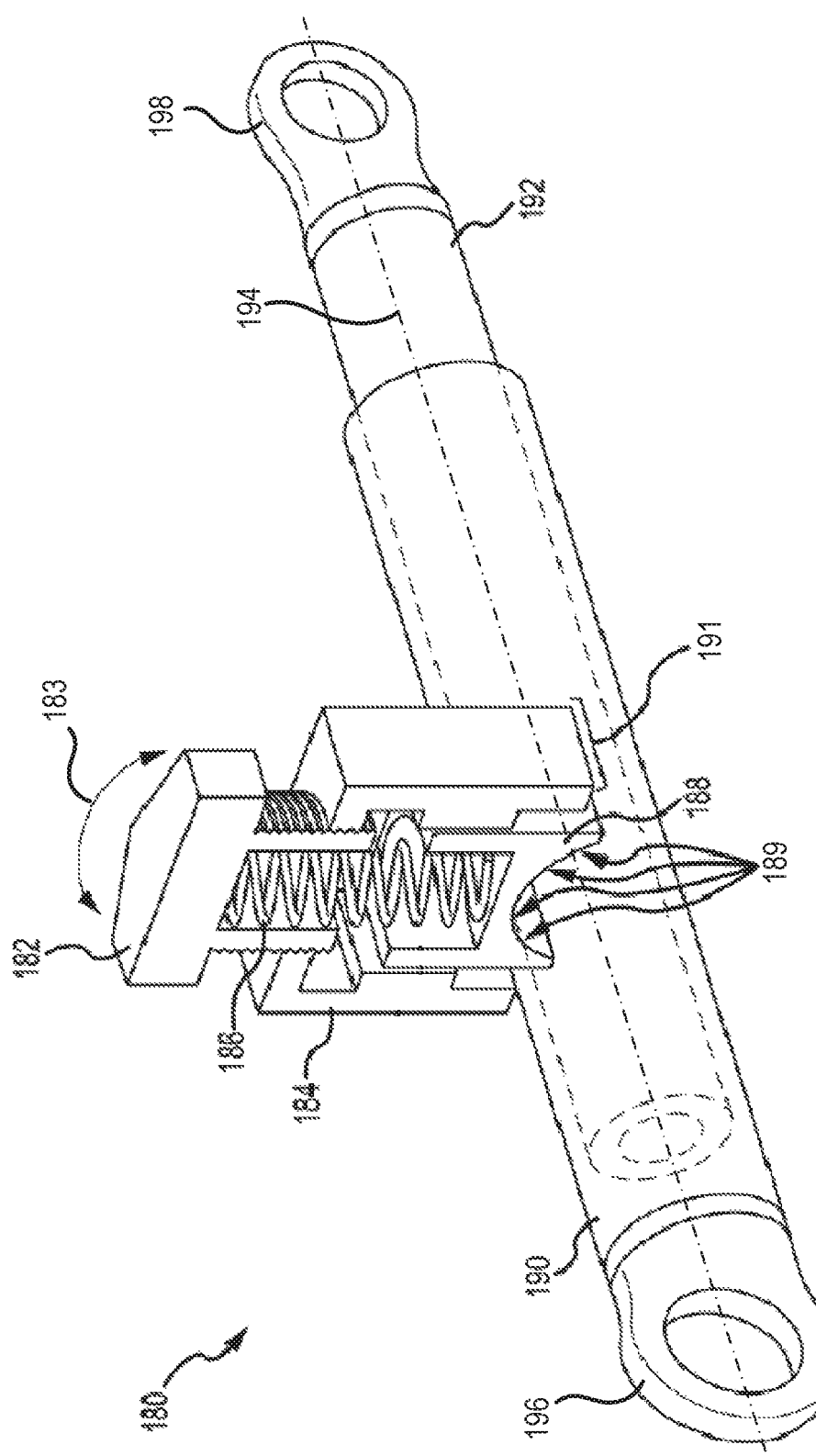
FIG. 11 illustrates an adjustable damper, in accordance with various embodiments.

With reference to FIG. 11, an adjustable damper 180 is illustrated, in accordance with various embodiments. With momentary reference to FIG. 9, although heat exchanger (HEX) 900 is illustrated as being connected to core engine 120 via first link 920, second link 922, third link, 924, and fourth link 926, HEX 900 may be coupled to core engine 120 via adjustable damper 180 in a manner similar to first link 920, second 922, third link, 924, and fourth link 926. For example, first tube 190 of adjustable damper 180 may comprise a first terminus 196. Second tube 192 of adjustable damper 180 may comprise a second terminus 198. With momentary additional reference to FIG. 9, first terminus 196 may be configured to be attached to core engine 120, in accordance with various embodiments. First terminus 196 may be configured to be attached to HEX 900, in accordance with various embodiments. Second terminus 198 may be configured to be attached to core engine 120, in accordance with various embodiments. Second terminus 198 may be configured to be attached to HEX 900, in accordance with various embodiments. Thus, in various embodiments, adjustable damper 180 may be for connecting HEX 900 to core engine 120.

In various embodiments, adjustable damper 180 may comprise an adjusting member 182, a housing 184, a spring member 186, a moveable member 188, a first tube 190, and a second tube 192. In various embodiments, adjusting member 182 may be adjustably coupled to housing 184. Stated another way, adjusting member 182 may be coupled to housing 184 such that adjusting member may be adjusted to move adjusting member 182 with respect to housing 184. In various embodiments, adjusting member 182 may be threadingly attached to housing 184 as illustrated in FIG. 11. In various embodiments, adjusting member 182 may comprise a bolt or the like. In various embodiments, spring member 186 may be coupled between moveable member 188 and adjusting member 182. Moveable member 188 may be located at least partially within housing 184. Moveable member 188 may be moveably retained, at least in part, by housing 184. Second tube 192 may be configured to be inserted into first tube 190. First tube 190 and second tube 192 may comprise a longitudinal axis 194. Thus, second tube 192 may move along longitudinal axis 194 relative to first tube 190.

In various embodiments, housing 184 may be coupled to a cut-out 191 located on first tube 190. Housing 184 may be coupled to cut-out 191 via a weld, solder, braze, or any other suitable method. In various embodiments, housing 184 may be coupled to first tube 190 proximate cut-out 191. In various embodiments, moveable member 188 may comprise a contacting surface 189. Moveable member 188 may be configured to contact second tube 192 via contacting surface 189. Contacting surface 189 may dampen the movement of second tube 192 via a friction force. Moveable member 188 may be in contact with second tube 192 via cut-out 191. Stated another way, moveable member 188 may extend through cut-out 191. A force may be transferred from first tube 190, through housing 184, through adjusting member 182, through spring member 186, into moveable member 188, and into second tube 192. The magnitude of this force may be adjusted by turning adjusting member 182 into and/or out of housing 184. For example, the magnitude of the force may increase in response to turning adjusting member 182 into housing 184 and may decreases in response to turning adjusting member 182 out of housing 184. Stated another way, the spring member 186 may compress in response to adjusting member 182 being turned into housing 184 and spring member 186 may decompress in response to adjusting member 182 being turned out of housing 184. Adjusting member 182 may be turned in a rotational direction, as illustrated by arrow 183, relative to housing 184.

As illustrated in FIG. 11, spring member 186 may comprise a coil spring. However, spring member 186 may comprise a Belleville washer, a leaf spring, or any other suitable spring, in accordance with various embodiments. Spring member 186 may compress in response to adjusting member 182 being turned into housing 184. Spring 186 may extend in response to adjusting member 182 being turned out of housing 184.

Figure 11A:
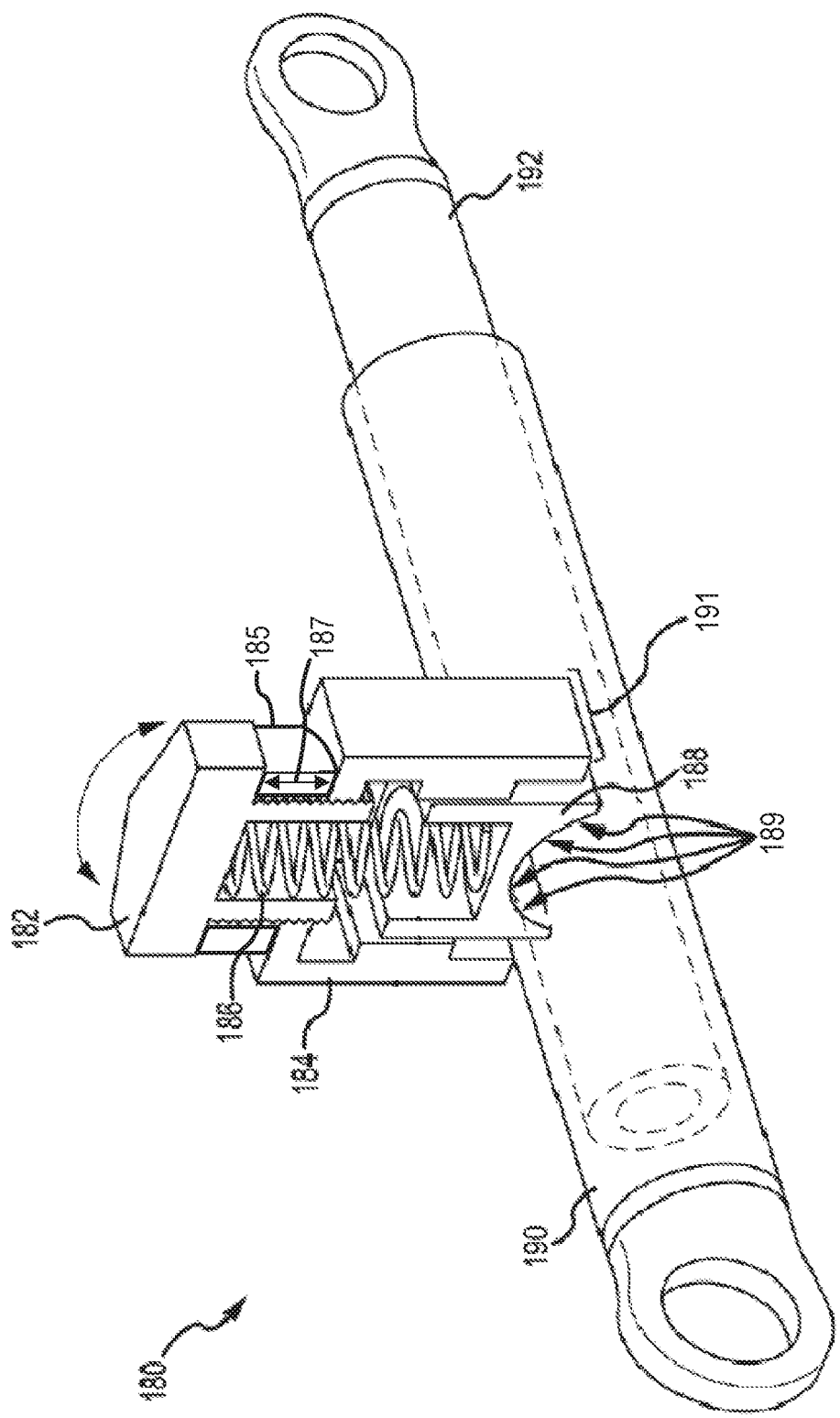
FIG. 11A illustrates an adjustable damper with a reference washer, in accordance with various embodiments.

With reference to FIG. 11A, adjustable damper 180 is illustrated having a washer (also referred to herein as a reference washer) 185. Washer 185 may comprise a thickness 187. It may be desirable to provide a reference for how many turns an operator should turn adjusting member 182 into housing 184. Thus, washer 185 may be placed between adjusting member 182 and housing 184. In this fashion, washer 185 may perimetrically surround adjusting member 182. Adjusting member 185 may be turned, or otherwise moved, into housing 184 until adjusting member 182 contacts washer 185, at which point washer 185 may prevent adjusting member 182 from being turned into housing 184. Accordingly, the thickness 187 of washer 185 may determine the position of adjusting member 182 relative to housing 184. Over time, contacting surface 189 may wear due to vibration or motion of first tube 192 relative to contacting surface 189. Furthermore, the spring constant of spring member 186 may change over time due to various loads such as mechanical and thermal loading. Thus, washer 185 may be exchanged for a second washer comprising a decreased thickness. In this manner, adjusting member 182 may be turned further into housing 184 with the washer having a decreased thickness in comparison with washer 185 having thickness 187.

In various embodiments, with further reference to FIG. 12, although adjustable damper 180 may be used to connect HEX 900 to core engine 120, adjustable damper 180 may be used to dampen a movement of HEX 900 relative to core engine 120. For example, a movement of HEX 900 relative to core engine 120 may be identified in the radial or y-direction, as illustrated in FIG. 12. Thus, adjustable damper 180 may be coupled between HEX 900 and core engine 120 to dampen the movement. In response to the movement, first tube 190 may move relative to second tube 192 and in response contacting surface 189 may dampen said movement.

In various embodiments, with reference to FIG. 10A, a cross-section view of a heat exchanger 10 is illustrated. With momentary reference to FIG. 4, heat exchanger 10 may be similar to HEX 400. In various embodiments, heat exchanger 10 may comprise an inlet 12, an outlet 14, one or more tubes, such as plurality of tubes 20, and a baffle 16. In various embodiments, plurality of tubes 20 may include tube 22, for example. Tube 22 may comprise a first end 24 and a second end 26. First end 24 may be coupled to inlet 12. Second end 26 may be coupled to outlet 14. In various embodiments, air for cooling (or hot air) may enter inlet 12, travel through hot air flow path 40 into plurality of tubes 20, and exit plurality of tubes 20 into outlet 14. In various embodiments, with momentary reference to FIG. 4, baffle 16 may be similar to baffle 436.

Figure 10B:
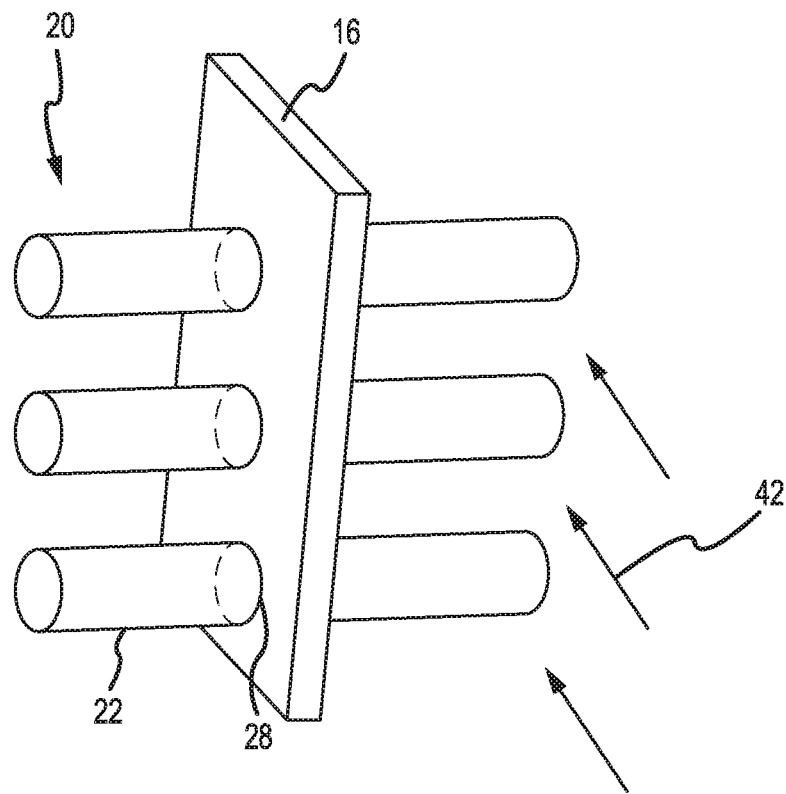
FIG. 10B illustrates a perspective view of a baffle for a heat exchanger, in accordance with various embodiments.

With reference to FIG. 10A and FIG. 10B, a perspective view of baffle 16 is illustrated in FIG. 10B, in accordance with various embodiments. Plurality of tubes 20 may be inserted into one or more apertures, such as aperture 28 for example, in baffle 16. In various embodiments, baffle 16 may be fixed to an adjacent component such as a heat exchanger shroud or other fixed object. Cooling air flow path 42 may comprise air which flows across plurality of tubes 20. In various embodiments, heat may be transferred from air in hot air flow path 40 to air in cooling air flow path 42. Thus, air entering heat exchanger 10 may comprise a greater temperature than air exiting heat exchanger 10. In various embodiments, plurality of tubes 20 may extend in the x-direction. In various embodiments, cooling air flow path 42 may flow generally in the z-direction. Thus, cooling air flow path 42 and hot air flow path 40 may form a cross-flow. However, cooling air flow path 42 and hot air flow path 40 may comprise a cross-flow, counter-flow, co-flow, or any other type of flow. Stated another way, the orientation of hot air flow path 40 relative to cooling air flow path 42 may be in any direction.

Figure 10C:
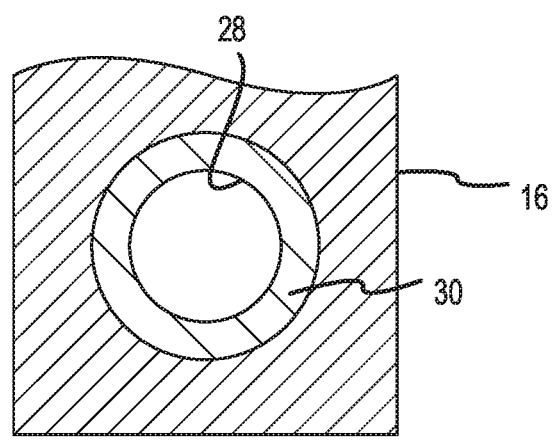
FIG. 10C illustrates a baffle with an oxidized layer, in accordance with various embodiments.

In various embodiments, with reference to FIG. 10C, baffle 16 may be made of a cobalt alloy (e.g., HAYNES 188) or other materials suitable to create an oxidized layer when exposed to temperatures that may exceed 1,000° F. (538° C.) degrees. In various embodiments, baffle 16 may be configured to form an oxidized layer 30 over an outer surface, such as aperture 28, of the baffle in response to an increase in temperature. In various embodiments, with further reference to FIG. 10A, the oxidized layer 30 may provide a lubricating surface over which plurality of tubes 20 may easily slide across. For example, tube 22 may expand or contract in an axial direction (x-direction in FIG. 10A) in response to an increase or decrease, respectively, in temperature. Thus, tube 22 may easily slide through aperture 28 across oxidized layer 30. Oxidized layer 30 may prevent or lessen stress in heat exchanger 10 during expansion and/or contraction.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An adjustable damper, comprising:
    a first tube;
    a second tube located at least partially within the first tube, the second tube defining a first longitudinal axis;
    a housing coupled to the second tube;
    a moveable member disposed at least partially within the housing, the moveable member defining a second longitudinal axis, the second longitudinal axis disposed perpendicular to the first longitudinal axis of the second tube, the moveable member comprising a contacting surface configured to contact an outer surface of the second tube, the moveable member configured to dampen movement of the second tube by friction force, the moveable member defining a first recess;
    an adjusting member adjustably coupled to the housing, adjusting member comprising a head and a shaft, the adjusting member defining a second recess in the shaft, the contact surface of the of the moveable member configured to contact the outer surface of the second tube in response to turning the adjusting member;
    a spring member located between the moveable member and the adjusting member, the spring member extending along the second longitudinal axis from the first recess to the second recess, the spring member configured to at least one of compress or decompress in response to the adjusting member moving relative to the housing; and
    a washer placed between the adjusting member and the housing, wherein the adjusting member is configured to be moved into the housing until it contacts the washer, at which point the washer is configured to prevent the adjusting member from being further moved into the housing.

2. The adjustable damper of claim 1, wherein a force is transferred from the first tube, through the housing, through the adjusting member, through the spring member, into the moveable member, and into the second tube via the contacting surface for damping a movement of the second tube in a longitudinal direction.

* * * * *